US012469617B2

(12) United States Patent
Park

(10) Patent No.: US 12,469,617 B2
(45) Date of Patent: Nov. 11, 2025

(54) POGO PIN FOR SUPER HIGH CURRENT

(71) Applicant: IWIN SOLUTION CORPORATION, Cheongju-si (KR)

(72) Inventor: Hojun Park, Cheongju-si Chungcheongbuk-do (KR)

(73) Assignee: IWIN SOLUTION CORPORATION, Cheongju-si (KR)

( * ) Notice: Subject to any disclaimer, the term of this patent is extended or adjusted under 35 U.S.C. 154(b) by 191 days.

(21) Appl. No.: 18/346,404

(22) Filed: Jul. 3, 2023

(65) Prior Publication Data

US 2025/0014776 A1 Jan. 9, 2025

(51) Int. Cl.
*H01B 5/00* (2006.01)

(52) U.S. Cl.
CPC .................................... *H01B 5/002* (2013.01)

(58) Field of Classification Search
CPC . H01B 5/002; H01R 13/2421; H01R 13/2471
See application file for complete search history.

(56) References Cited

FOREIGN PATENT DOCUMENTS

| | | | | | |
|---|---|---|---|---|---|
| CN | 203932402 | U | * | 11/2014 | ........... H01R 13/187 |
| CN | 109103643 | A | * | 12/2018 | ............. H01R 13/24 |
| WO | 2021235704 | A1 | | 11/2021 | |

* cited by examiner

*Primary Examiner* — Christopher E Mahoney
(74) *Attorney, Agent, or Firm* — Rabin & Berdo, P.C.

(57) ABSTRACT

A pogo pin for an ultra-high current includes a first plunger (20), a coil spring (10) configured to elastically support the first plunger, and an outer cylinder (40) allowing the coil spring to be mounted therein and configured to guide sliding of the first plunger, wherein a plurality of brushes (21) is provided on one end of the first plunger such that the plurality of brushes is capable of sliding while elastically contacting an inner surface of the outer cylinder, and the coil spring (10) has an insertion part (I1) passing between the plurality of brushes and located inside the first plunger (20), with each turn of the insertion part being wound in close contact with each other.

3 Claims, 12 Drawing Sheets

POGO PIN FOR SUPER HIGH CURRENT

BACKGROUND OF THE INVENTION

Field of the Invention

The present disclosure relates to a pogo pin which enables the transmission of an ultra-high current.

Description of the Related Art

A patent document of a related art, which is a prior application by the applicant of the present application, discloses a technology related to a pogo pin that enables the transmission of an ultra-high current by improving the electrical characteristics of the pogo pin by using a brush.

As illustrated in FIG. 12, the pogo pin of the prior application includes two plungers 50, springs 60 and an outer cylinder 70. Except for springs 60, the two plungers 50 and the outer cylinder are manufactured by machining a flat material. Due to a brush 53 elastically contacting the inner surface of the outer cylinder 40, an electrical path with very low impedance is realized.

However, in the pogo pin of the prior application, there is a problem that interference between the brush 53 and the springs 60 may occur. As the pogo pin is compressed or extended, the two plungers 50 move up and down, and accordingly, the brush 53 also moves up and down along the inner surface of the outer cylinder 70. In this case, the brush 53 may be caught in the springs 60.

Although the problems of the prior art have been described above, recognition of these problems is not obvious to those skilled in the art of the present disclosure.

DOCUMENT OF RELATED ART (Patent Document) PCT Publication No. WO/2021/235704 (published on Nov. 25, 2021) "POGO PIN FOR ULTRA-HIGH CURRENT"

SUMMARY OF THE INVENTION

Accordingly, the present disclosure has been made keeping in mind the above problems occurring in the related art, and the present disclosure is intended to propose a pogo pin for an ultra-high current which reduces interference between a spring and a brush.

In addition, the present disclosure is intended to propose a pogo pin for an ultra-high current which reduces contact resistance (contact impedance) between a brush and an outer cylinder.

Other objectives of the present disclosure may be further added or made clear by "DETAILED DESCRIPTION OF THE INVENTION" to be described later.

In order to achieve the above objectives, according to one aspect of the present disclosure, there is provided a pogo pin for an ultra-high current, the pogo pin including: a first plunger; a coil spring configured to elastically support the first plunger; and an outer cylinder allowing the coil spring to be mounted therein and configured to guide sliding of the first plunger, wherein a plurality of brushes is provided on one end of the first plunger such that the plurality of brushes is capable of sliding while elastically contacting an inner surface of the outer cylinder, and the coil spring has an insertion part passing between the plurality of brushes and located inside the first plunger, with each turn of the insertion part being wound in close contact with each other.

In the pogo pin for an ultra-high current described above, an outer diameter of the insertion part over an entire length of the insertion part may be smaller than an average outer diameter of a non-insertion part located outside the first plunger.

The pogo pin for an ultra-high current described above may further include: a second plunger elastically supported by the coil spring, wherein the outer cylinder may guide sliding of the second plunger, and a plurality of second brushes may be provided on one end of the second plunger such that the plurality of second brushes is capable of sliding while elastically contacting the inner surface of the outer cylinder, the coil spring may include: a first small-diameter part 10*a*, a portion or an entirety of which is inserted into the first plunger; a second small-diameter part 10*b*, a portion or an entirety of which is inserted into the second plunger; and a large-diameter part 10*c* configured to connect the first small-diameter part 10*a* with the second small-diameter part 10*b*, wherein an outer diameter of the first small-diameter part 10*a* and an outer diameter of the second small-diameter part 10*b* may be smaller than an outer diameter of the large-diameter part 10*c*, and each turn of the first small-diameter part 10*a* and the second small-diameter part 10*b* may be wound in close contact with each other.

The pogo pin for an ultra-high current described above may further include: a second plunger elastically supported by the coil spring, wherein the outer cylinder may guide the sliding of the second plunger, a plurality of second brushes may be provided on one end of the second plunger such that the plurality of second brushes is capable of sliding while elastically contacting the inner surface of the outer cylinder, and the coil spring may include a contact part 11*e* located on a central part of the coil spring and having an outer diameter so that the contact part 11*e* is in contact with the outer cylinder.

In the pogo pin for an ultra-high current described above, the coil spring may include: a first small-diameter part 11*a*, a portion or entirety of which is inserted into the first plunger; a second small-diameter part 11*b*, a portion or entirety of which is inserted into the second plunger; a first large-diameter part 11*c* formed between the contact part 11*e* and the first small-diameter part 11*a*, with the first large-diameter part 11*c* having an outer diameter larger than an outer diameter of the first small-diameter part 11*a* and smaller than the outer diameter of the contact part 11*e*; and a second large-diameter part 11*d* formed between the contact part 11*e* and the second small-diameter part 11*b*, with the second large-diameter part 11*d* having an outer diameter larger than an outer diameter of the second small-diameter part 11*b* and smaller than the outer diameter of the contact part 11*e*.

The pogo pin for an ultra-high current according to another aspect of the present disclosure includes: a first plunger; a coil spring configured to elastically support the first plunger; and an outer cylinder allowing the coil spring to be mounted therein and configured to guide the sliding of the first plunger, wherein a plurality of brushes is provided on one end of the first plunger such that the plurality of brushes is capable of sliding while elastically contacting an inner surface of the outer cylinder, wherein a part of each of the brushes in contact with the outer cylinder or a vicinity of the part of the brush in contact with the outer cylinder is chamfered.

In the pogo pin for an ultra-high current described above, the brush may be chamfered to have a width decreasing toward an end of the brush.

In the pogo pin for an ultra-high current described above, the brush may include: a first plane facing the inner surface of the outer cylinder, and a second plane parallel to the first plane and located at a side opposite to the first plane, wherein an outline of the first plane on an end part of the brush may be a convex first curve crossing the brush in a width direction thereof.

In the pogo pin for an ultra-high current described above, an outline of the second plane on the end part of the brush may be a convex second curve crossing the brush in the width direction thereof, and a curved surface in contact with the first curve or the second curve may be formed between the first plane and the second plane on the end part of the brush.

In the pogo pin for an ultra-high current described above, the curved surface S3 may be formed by chamfering the end part of the brush along the first curve or the second curve, and may be formed to be oblique rather than perpendicular to the first plane and the second plane so that an area of contact of the curved surface S3 with the outer cylinder is increased.

In the pogo pin for an ultra-high current described above, the first plunger may include a 1-2 plunger cylindrical part 23 connected to a first probe part 24 for contact with the outside and extending in a cylindrical shape, and the outer cylinder may include a first outer cylindrical part 41 guiding the 1-2 plunger cylindrical part 23 and having a cylindrical shape, wherein the first outer cylindrical part 41 may be formed to extend from an inside of a socket body 60 to a surface of the socket body.

The pogo pin for an ultra-high current according to still another aspect of the present disclosure includes: a first plunger and a second plunger; a coil spring configured to elastically support the first plunger and the second plunger on opposite ends of the coil spring, respectively; and an outer cylinder allowing the coil spring to be mounted therein and configured to guide the sliding of each of the first plunger and the second plunger.

In the pogo pin for an ultra-high current described, the second plunger may include: a 2-1 plunger cylindrical part of a cylindrical shape; and a 2-2 plunger cylindrical part, which is shaped cylindrically, having a step and connected to the 2-1 plunger cylindrical part, with the 2-2 plunger cylindrical part being located farther from the coil spring than the 2-1 plunger cylindrical part and having an outer diameter smaller than an outer diameter of the 2-1 plunger cylindrical part, and the outer cylinder 50 may include a U-shaped or inverted U-shaped window **52*b* and a holding piece 52*a* formed by punching the window, wherein the holding piece 52*a* may extend in a longitudinal direction of the second plunger, and after the outer cylinder and the second plunger are assembled with each other, a free end of the holding piece 52*a*** may be held on the step to be prevented from being removed.

According to the pogo pin for an ultra-high current of the present disclosure, interference between the spring and the brush can be prevented. Each turn of the first small-diameter part (at least a first insertion part) or/and the second small-diameter part (at least a second insertion part) is configured in close contact with each other, thereby preventing interference between the coil spring and the brush.

According to the pogo pin for an ultra-high current of the present disclosure, it is possible to reduce contact resistance (contact impedance) between the brush and the outer cylinder. Particularly, an obliquely chamfered curved surface S3 greatly increases the area of contact of the brush with the inner surface of the outer cylinder 40, thereby significantly reducing contact resistance (contact impedance).

According to the pogo pin for an ultra-high current of the present disclosure, an annular groove is not required to be formed on the outer cylinder, thereby making a manufacturing process easier and increasing yield.

According to the pogo pin for an ultra-high current of the present disclosure, the horizontal shaking of the plunger is minimized, thereby reducing jamming phenomenon between the plunger and the outer cylinder.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 1A and 1B are perspective views illustrating a pogo pin for an ultra-high current according to a first embodiment of the present disclosure, wherein FIG. 1A illustrates an outer cylinder, and FIG. 1B illustrates a first plunger, a second plunger, and a coil spring;

FIGS. 2A and 2B are sectional views illustrating the pogo pin for an ultra-high current according to the first embodiment of the present disclosure, wherein FIG. 2A illustrates the entirety of the pogo pin, and FIG. 2B illustrates only the coil spring;

FIGS. 3A and 3B are partially sectional views illustrating the pogo pin for an ultra-high current according to the first embodiment of the present disclosure, wherein FIG. 3A illustrates a state before compression, and FIG. 3B illustrates a state after compression;

FIGS. 5A and 5B are partial sectional views illustrating the pogo pin for an ultra-high current according to the second embodiment of the present disclosure, wherein FIG. 5A illustrates a state before compression, and FIG. 5B illustrates a state after compression;

FIGS. 6A, 6B, 6C, 6D, and 6E are detailed views illustrating brushes in the pogo pin for an ultra-high current according to the first embodiment of the present disclosure, wherein FIG. 6A illustrates the vicinity of first brushes, FIG. 6B illustrates the vicinity of second brushes, FIG. 6C is a plan view illustrating only a brush, FIG. 6D is a vertical sectional view, and FIG. 6E is a cross-sectional view;

FIGS. 7A, 7B, 7C, 7D, and 7E are detailed views illustrating brushes in the pogo pin for an ultra-high current according to a third embodiment of the present disclosure, wherein FIG. 7A illustrates the vicinity of first brushes, FIG. 7B illustrates the vicinity of second brushes, FIG. 7C is a plan view illustrating only a brush, FIG. 7D is a vertical sectional view, and FIG. 7E is a cross-sectional view;

FIGS. 8A, 8B, 8C, and 8D illustrate the pogo pin for an ultra-high current according to a fourth embodiment of the present disclosure, wherein FIG. 8A illustrates the vicinity of first brushes, FIG. 8B illustrates the vicinity of second brushes, FIG. 8C is a plan view of a brush, and FIG. 8D is a cutaway cross-sectional view illustrating a portion of an outer cylinder in contact with the brush;

FIGS. 9A, 9B, 9C, and 9D illustrate the pogo pin for an ultra-high current according to a fifth embodiment of the present disclosure, wherein FIG. 9A illustrates the vicinity of first brushes, FIG. 9B illustrates the vicinity of second brushes, FIG. 9C is a perspective view of a brush, and FIG.

Figure 10A:
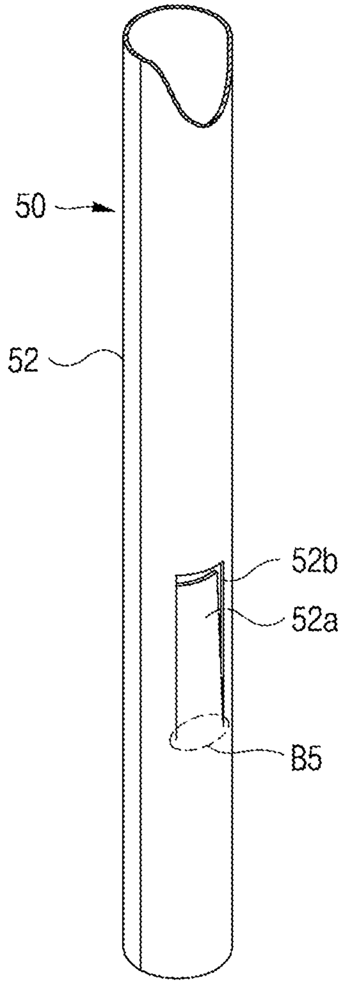
Figure 10B:
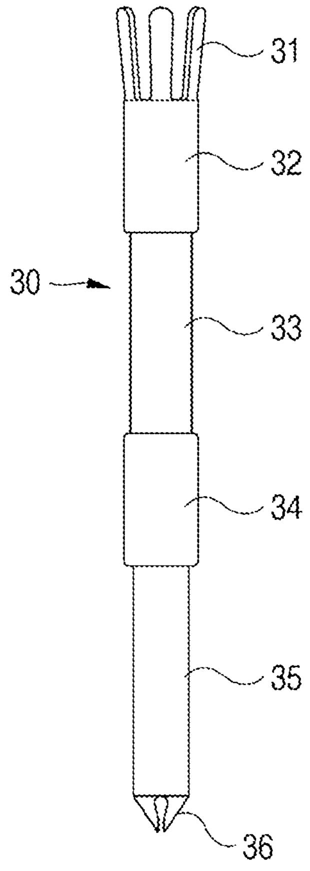
Figure 10C:
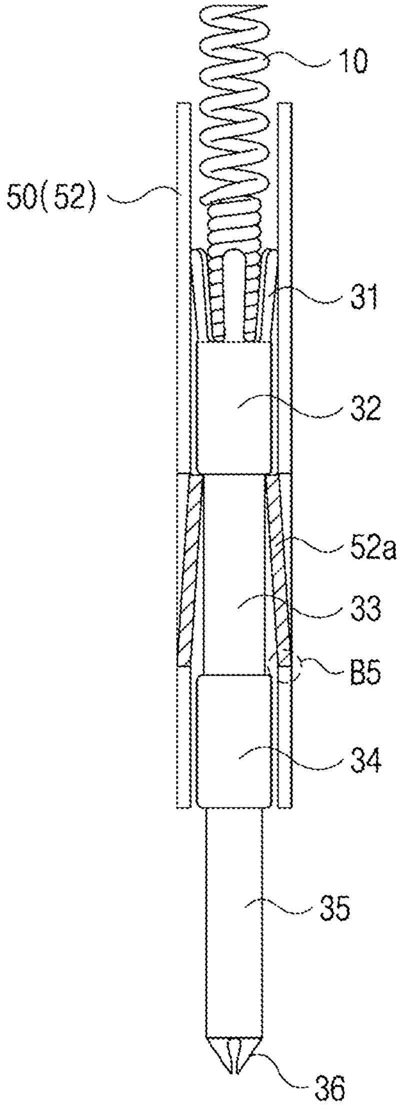
Figure 11:
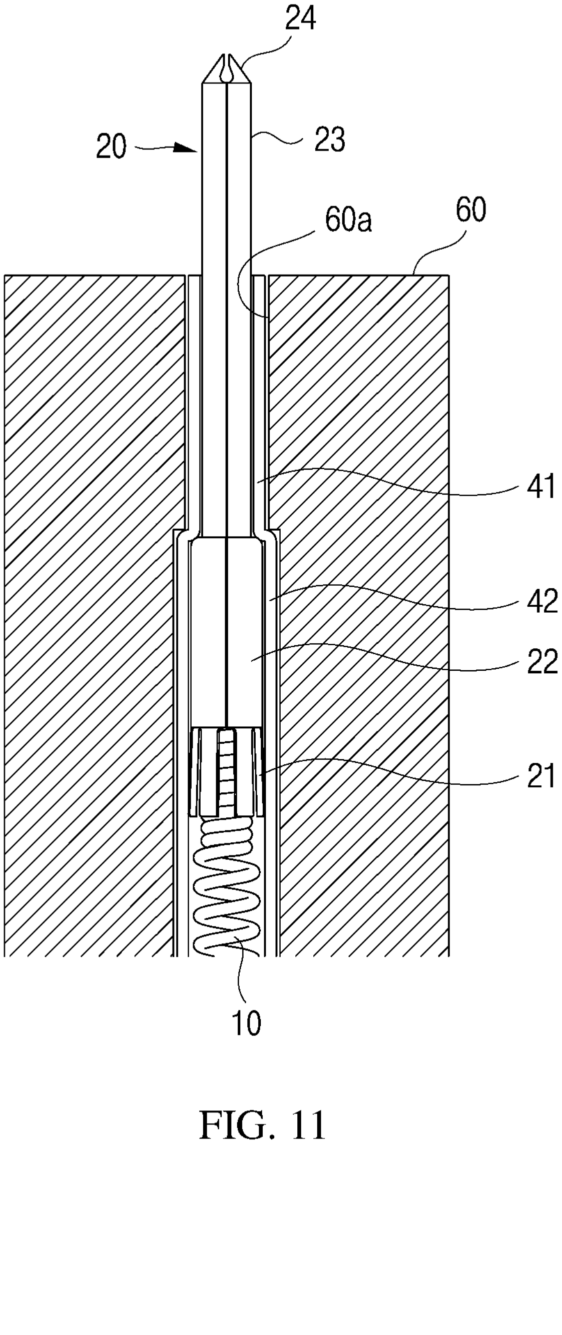
Figure 12A:
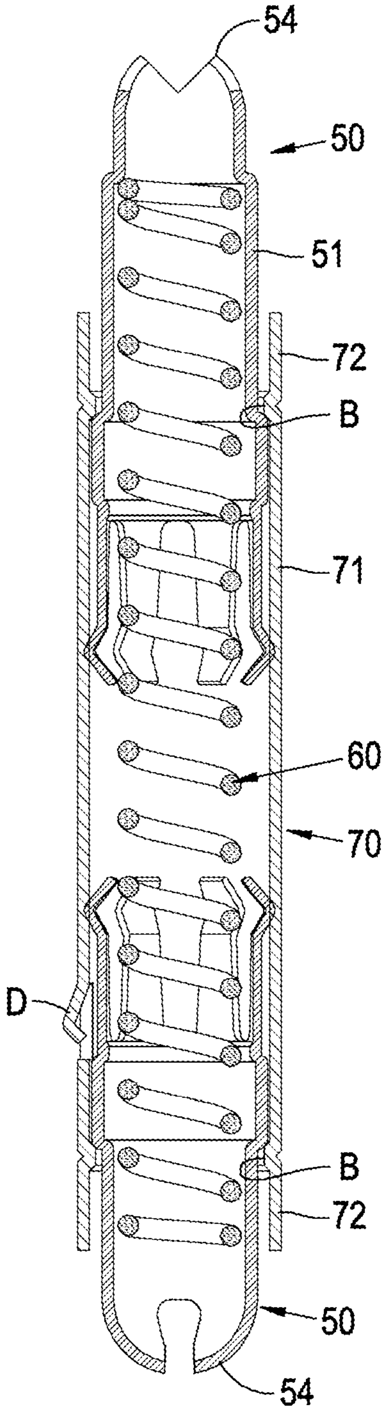
Figure 12B:
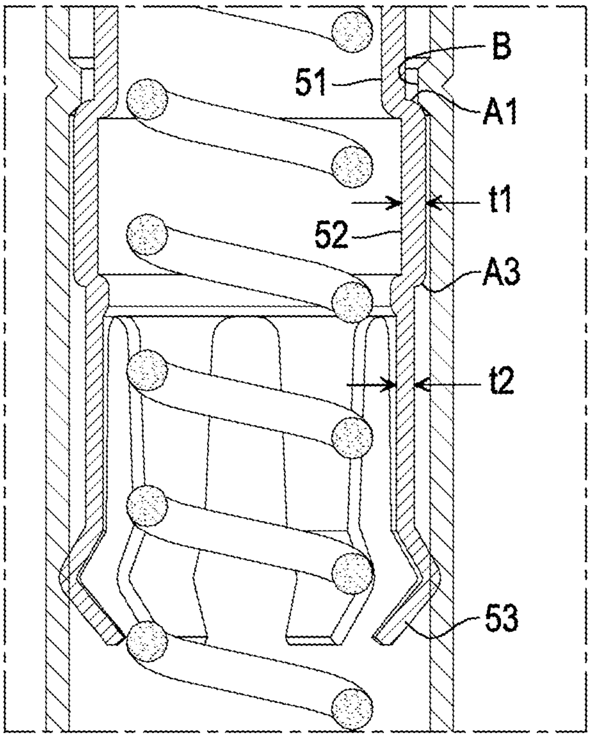

9D is a cutaway cross-sectional view illustrating a portion of an outer cylinder in contact with the brush;

FIGS. 10A, 10B, and 10C illustrate the pogo pin for an ultra-high current according to a sixth embodiment of the present disclosure, wherein FIG. 10A is a partial perspective view of an outer cylinder, FIG. 10B is a side view of the second plunger, and FIG. 10C is a partial sectional view illustrating the outer cylinder and the second plunger combined with each other;

FIG. 11 is a sectional view illustrating the pogo pin for an ultra-high current and a socket body according to a seventh embodiment of the present disclosure; and FIGS. 12A and 12B are is sectional views illustrating a pogo pin for an ultra-high current according to a previous application by an applicant of the present disclosure.

DETAILED DESCRIPTION OF THE INVENTION

With reference to the accompanying drawings, embodiments of the present disclosure will be described in detail so that those skilled in the art to which the present disclosure belongs can easily embody the embodiments. However, the present disclosure may be implemented in many different forms and is not limited to the embodiments described herein. In addition, in order to clearly explain the present disclosure, parts irrelevant to the description are omitted from the drawings, and similar names and reference numerals are used for similar parts throughout the specification.

Figure 1A:
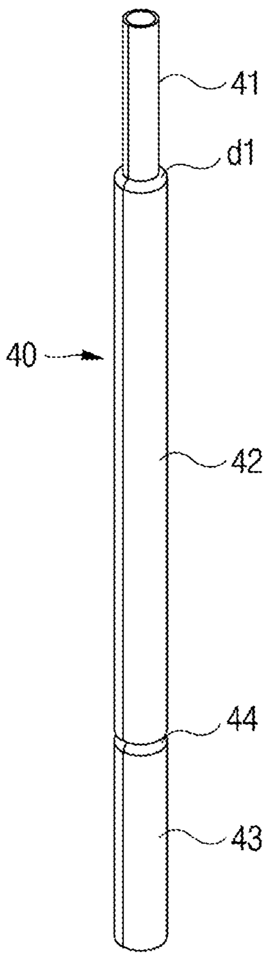
Figure 1B:
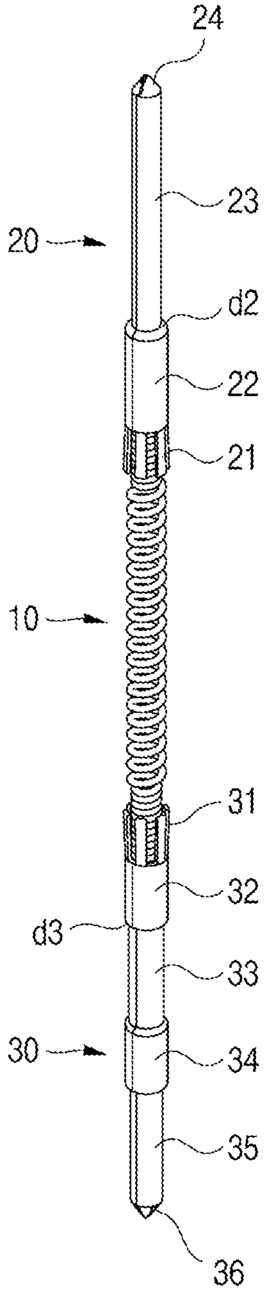

FIGS. 1A and 1B are perspective views illustrating a pogo pin for an ultra-high current according to a first embodiment of the present disclosure, wherein FIG. 1A illustrates an outer cylinder, and FIG. 1B illustrates a first plunger, a second plunger, and a coil spring.

Figure 2A:
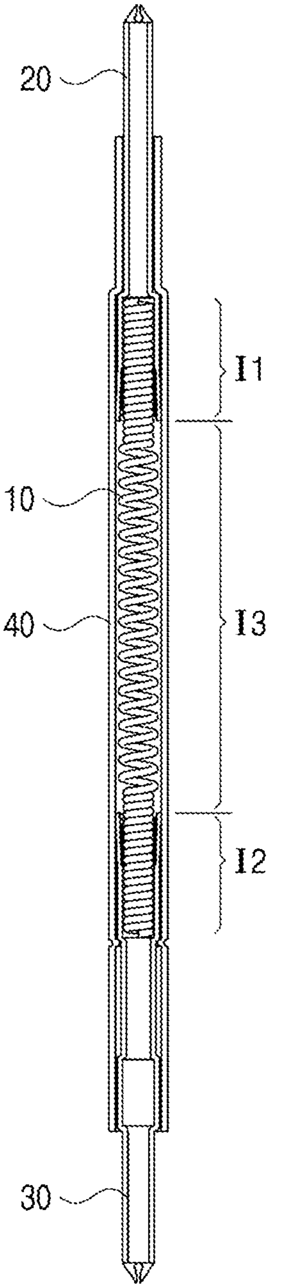
Figure 2B:
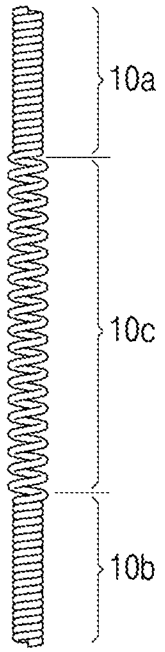

FIGS. 2A and 2B are sectional views illustrating the pogo pin for an ultra-high current according to the first embodiment of the present disclosure, wherein FIG. 2A illustrates the entirety of the pogo pin, and FIG. 2B illustrates only the coil spring.

Figure 3A:
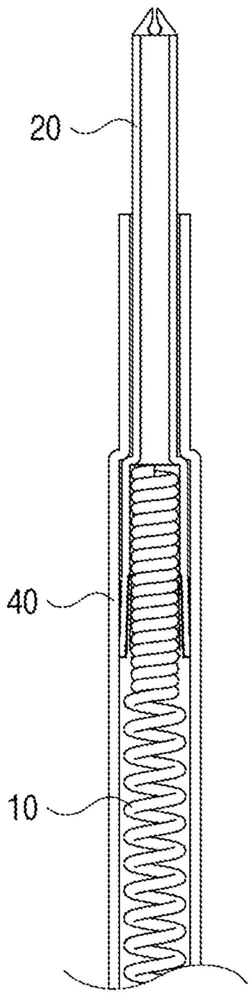
Figure 3B:
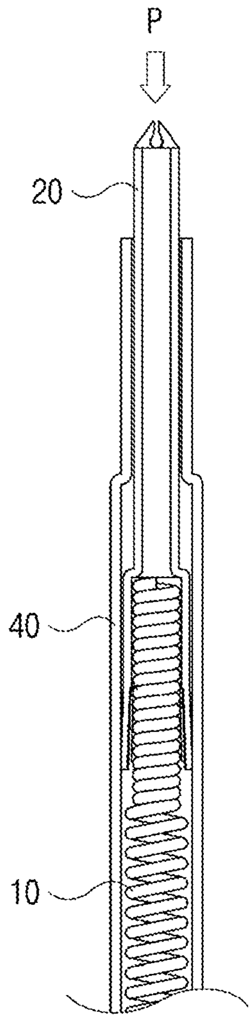

FIGS. 3A and 3B are partially sectional views illustrating the pogo pin for an ultra-high current according to the first embodiment of the present disclosure, wherein FIG. 3A illustrates a state before compression, and FIG. 3B illustrates a state after compression.

The pogo pin according to the first embodiment of the present disclosure includes the coil spring 10, the first plunger 20, the second plunger 30, and the outer cylinder 40, wherein the first plunger 20, the second plunger 30, and the outer cylinder 40 are manufactured by processing a flat metal material.

The outer cylinder 40 allows the coil spring 10 to be mounted therein and guides the sliding of the first plunger 20 and the second plunger 30. On a first side of the outer cylinder 40, the outer cylinder 40 covers the first plunger 20 so that the first plunger 20 can slide. On a second side of the outer cylinder 40, the outer cylinder 40 covers the second plunger 30 so that the second plunger 30 can slide. According to the vertical movement of the first plunger 20 and the second plunger 30, the length of each of the first plunger 20 and the second plunger 30 exposed to the outside of the outer cylinder 40 varies.

The outer cylinder 40 has a cylindrical shape, and includes a first outer cylindrical part 41, a second outer cylindrical part 42, a third outer cylindrical part 43, and a groove 44. The first outer cylindrical part 41 has a smaller inner diameter than the second outer cylindrical part 42, and a step d1 is formed therebetween. The second outer cylindrical part 42 and the third outer cylindrical part 43 are the same inner diameters, and the groove 44 formed between the second outer cylindrical part 42 and the third outer cylindrical part 43 is an annular groove recessed inward to have an inner diameter smaller than the inner diameters of the second outer cylindrical part 42 and the third outer cylindrical part 43.

The first plunger 20 and the second plunger 30 are located respectively on opposite ends of the coil spring 10 to be elastically supported by the coil spring. The first plunger 20 includes first brushes 21, a 1-1 plunger cylindrical part 22, a 1-2 plunger cylindrical part 23, and a first probe part 24. The second plunger 30 includes second brushes 31, a 2-1 plunger cylindrical part 32, a 2-2 plunger cylindrical part 33, a 2-3 plunger cylindrical part 34, a 2-4 plunger cylindrical part 35, and a second probe part 36. Each of the 1-1 plunger cylindrical part 22, the 1-2 plunger cylindrical part 23, the 2-1 plunger cylindrical part 32, the 2-2 plunger cylindrical part 33, the 2-3 plunger cylindrical part 34, and the 2-4 plunger cylindrical part 35 is formed into a cylindrical shape by bending a flat plate into a circular shape.

The first probe part 24 and the second probe part 36, which are intended to perform electrical contact with an object outside of the pogo pin, are exposed to the outside of the pogo pin, and may have various shapes. For example, the first probe part 24 and the second probe part 36 may contact a terminal of a semiconductor device, a terminal of a socket, or a pad of a PCB.

The 1-1 plunger cylindrical part 22 is a base to which the first brushes 21 are connected to extend downward therefrom, and the 2-1 plunger cylindrical part 32 is a base to which the second brushes 31 are connected to extend upward therefrom. The 1-1 plunger cylindrical part 22 and the 2-1 plunger cylindrical part 32 are guided inside the second outer cylindrical part 42 of the outer cylinder 40 and are movable up and down. The 1-1 plunger cylindrical part 22 is held by the step d1 between the second outer cylindrical part and the first outer cylindrical part to be prevented from being removed to the outside, and the 2-1 plunger cylindrical part 32 is held by the annular groove 44 formed between the second outer cylindrical part 42 and the third outer cylindrical part 43 to be prevented from being removed to the outside.

The 1-2 plunger cylindrical part 23 connects the 1-1 plunger cylindrical part 22 with the first probe part 24 and has an outer diameter smaller than the outer diameter of the 1-1 plunger cylindrical part 22 so that the 1-2 plunger cylindrical part 23 can move up and down by being guided by the first outer cylindrical part 41.

The 2-2 plunger cylindrical part 33 has an upper end connected to the 2-1 plunger cylindrical part 32 and has an outer diameter smaller than the 2-1 plunger cylindrical part 32. The 2-2 plunger cylindrical part 33 extends downward by having an outer diameter that matches the inner diameter of the groove 44 so that the 2-2 plunger cylindrical part 33 can pass through the groove 44. The 2-2 plunger cylindrical part 33 can move up and down while being guided by the inner side of the groove 44 when the second plunger 30 moves up and down. The length of the 2-2 plunger cylindrical part 33 extends as long as or longer than the vertical movable distance of the second plunger 30.

The 2-3 plunger cylindrical part 34 has an upper end connected to the 2-2 plunger cylindrical part 33 and has a larger outer diameter than the 2-2 plunger cylindrical part 33. The 2-3 plunger cylindrical part 34 matches the inner diameter of the third outer cylindrical part 43 and can move up and down while being guided by the third outer cylindrical part 43. The 2-4 plunger cylindrical part 35 extends to connect the 2-3 plunger cylindrical part 34 with the second probe part 36, and has a smaller outer diameter than the 2-3 plunger cylindrical part 34.

The first brushes 21 are provided on one end (a side opposite to the first probe part) of the first plunger 20. Specifically, the first brushes 21 extend downward from the 1-1 plunger cylindrical part 22, and can slide while elastically contacting the inner surface of the outer cylinder (the second outer cylindrical part). The second brushes 31 are provided on one end (a side opposite to the second probe part) of the second plunger 30. Specifically, the second brushes 31 extend upward from the 2-1 plunger cylindrical part 32 and can slide while elastically contacting the inner surface of the outer cylinder (the second outer cylindrical part). Before the assembly of the pogo pin, the plurality of first brushes 21 and the plurality of second brushes 31 respectively have outer diameters of ends larger than the inner diameter of the outer cylinder (the second outer cylindrical part) so that the plurality of first brushes 21 and the plurality of second brushes 31 are in elastically close contact with the outer the cylinder (the second outer cylindrical part) after assembly.

The coil spring 10 elastically supports the first plunger 20 at a first end thereof, and elastically supports the second plunger 30 at a second end thereof. The coil spring 10 includes a first insertion part I1 passing between the plurality of first brushes 21 and located inside the first plunger 20 (the 1-1 plunger cylindrical part). In addition, the coil spring 10 includes a second insertion part I2 passing between the plurality of second brushes 31 and located inside the second plunger 30 (the 2-1 plunger cylindrical part). The first end (an upper end) of the coil spring 10 is held by a step d2 between the 1-1 plunger cylindrical part and the 1-2 plunger cylindrical part, and the second end (a lower end) of the coil spring 10 is held by a step d3 between the 2-1 plunger cylindrical part 32 and the 2-2 plunger cylindrical part 33.

In the coil spring, each turn (a part of a coil which makes one turn) of the first insertion part I1 and the second insertion part I2 is wound in close contact with each other so that the number of turns of the first insertion part I1 and the second insertion part I2 in the coil spring does not change or changes very little during the operation of the pogo pin.

The outer diameter of the first insertion part over the entire length of the first insertion part I1 is smaller than the average outer diameter of a non-insertion part 13 located outside the first plunger. The outer diameter of the second insertion part over the entire length of the second insertion part I2 is smaller than the average outer diameter of the non-insertion part 13 located outside the second plunger.

The coil spring includes a first small-diameter part 10*a*, a second small-diameter part 10*b*, and a large-diameter part 10*c*. All or a portion of the first small-diameter part 10*a* is inserted into the first plunger (between the plurality of first brushes and into the 1-1 plunger cylindrical part), and all or a portion of the second small-diameter part 10*b* is inserted into the second plunger (between the plurality of second brushes and into the 2-1 plunger cylindrical part). Each turn of the first small-diameter part 10*a* and the second small-diameter part 10*b* is wound in close contact with each other.

By sharpening a front end of the first small-diameter part (by gradually reducing an outer diameter thereof), the front end of the coil spring can be easily inserted into the first plunger during the assembly, and by sharpening the front end of the second small-diameter part (by gradually reducing an outer diameter thereof), the front end of the coil spring can be easily inserted into the second plunger during the assembly.

After filling the first insertion part I1 completely, the first small-diameter part 10*a* may have a portion extending out of the first brushes, and after filling the second insertion part I2 completely, the second small-diameter part 10*b* may have a portion extending out of the second brushes.

The large-diameter part 10*c* connects the first small-diameter part 10*a* with the second small-diameter part 10*b*. The outer diameters of the first small-diameter part 10*a* and the outer diameter of the second small-diameter part 10*b* are smaller than the outer diameter of the large-diameter part 10*c*.

Since each turn of the first small-diameter part (at least a first insertion part) and the second small-diameter part (at least a second insertion part) is in close contact with each other, interference between the coil spring and the brushes is prevented.

Compared to when the pogo pin is extended, when the pogo pin is compressed, the coil spring is also compressed and shortened in length. For example, looking at a spring 60 according to the prior art of the applicant, the number of turns of the spring entering a plunger 50 increases according to the compression of the spring. That is, additional turns of the spring are put into the plunger 50. Accordingly, during the compression of the spring, there is a chance that the end of a brush will get caught between turns of the spring.

Meanwhile, according to the pogo pin of the present disclosure, compared to when the pogo pin is extended (see FIG. 3A), even when the pogo pin is compressed (see FIG. 3B), there is little or no turn of the coil spring newly entering the first plunger and the second plunger, that is, the number of turns of the insertion part is maintained to be the same or almost the same. Accordingly, in the pogo pin of the present disclosure, turns moving past the brushes (the front ends of the brushes) are minimized, so interference between the brushes and the coil spring is prevented.

The large-diameter part 10*c* connects the first small-diameter part with the second small-diameter part, and has a larger outer diameter than the first small-diameter part and the second small-diameter part, wherein the outer diameter is extended within a range allowing the large-diameter part 10*c* to slide inside the outer cylinder (the second outer cylindrical part). Conversely, the first small-diameter part and the second small-diameter part have smaller outer diameters than the large-diameter part, so that the first small-diameter part and the second small-diameter part are easily inserted into the first plunger and the second plunger, respectively, and can more easily pass between the plurality of brushes. In the previous application by the applicant of the present disclosure, the outer diameter of a spring is the same over the entire length of the spring, but according to the present disclosure, at least the outer diameters of the parts of the spring inserted into the first plunger and the second plunger, respectively, are reduced.

Figure 4A:
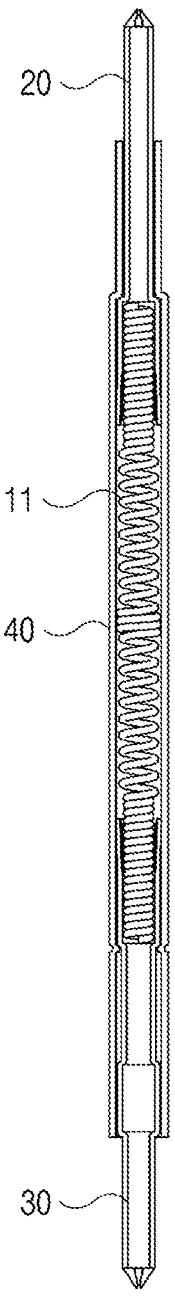
FIGS. 4A and 4B are sectional views illustrating the pogo pin for an ultra-high current according to a second embodiment of the present disclosure.
Figure 4B:
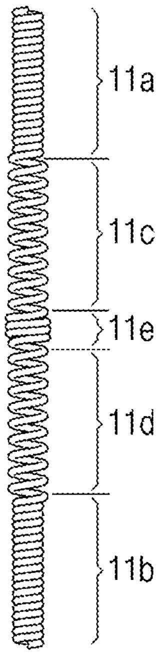
Figure 5A:
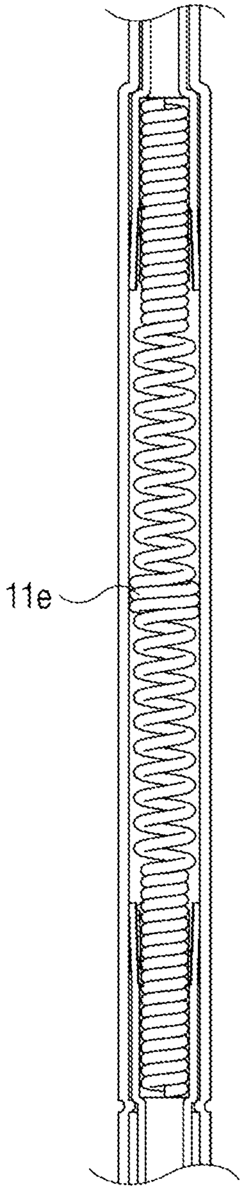
Figure 5B:
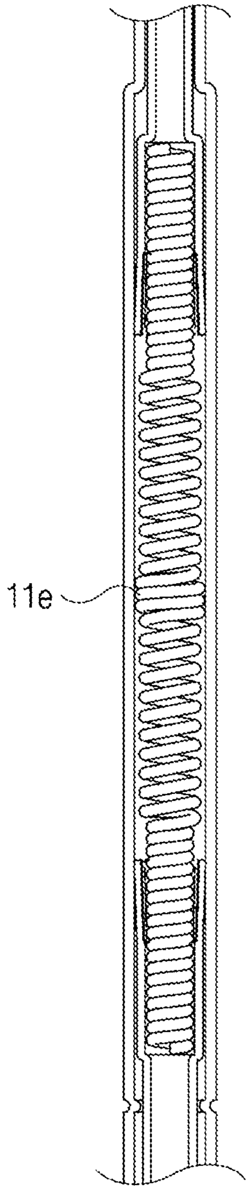

FIGS. 4A and 4B are sectional views illustrating the pogo pin for an ultra-high current according to a second embodiment of the present disclosure, and FIGS. 5A and 5B are partial sectional views illustrating the pogo pin for an ultra-high current according to the second embodiment of the present disclosure, wherein FIG. 5A illustrates a state before compression, and FIG. 5B illustrates a state after compression.

When the pogo pin for an ultra-high current according to the second embodiment of the present disclosure is compared with the pogo pin for an ultra-high current of the first embodiment, the structure of a coil spring 11 of the pogo pin of the second embodiment is different from the structure of the coil spring 10, so the coil spring 11 will be mainly described, and the description of the remaining parts will be omitted.

The coil spring 11 includes a contact part 11*e*, a first small-diameter part 11*a*, a second small-diameter part 11*b*, a first large-diameter part 11*c*, and a second large-diameter part 11*d*.

The contact part 11*e* is located in the central part of the coil spring and has an outer diameter so that the contact part 11*e* is in contact with the outer cylinder 40. The contact part 11*e* is a part with the largest outer diameter in the coil spring. The contact part 11*e* may be forcibly moved to the center of the outer cylinder 40 through the second outer cylindrical part and the third outer cylindrical part during assembly, but has the outer diameter with which the movement of the contact part 11*e* is difficult or is inefficient during the operation of the pogo pin.

A portion or entirety of the first small-diameter part 11*a* is inserted into the first plunger, a portion or entirety of the second small-diameter part 11*b* is inserted into the second plunger, and as in the first embodiment, the first small-diameter part 11*a* and the second small-diameter part 11*b* have each turn in close contact with each other and have smaller outer diameters than the first large-diameter part 11*c* and the second large-diameter part 11*d*.

The first large-diameter part 11*c* is formed between the contact part 11*e* and the first small-diameter part 11*a* and has an outer diameter larger than the outer diameter of the first small-diameter part 11*a* and smaller than the outer diameter of the contact part 11*e*, and the second large-diameter part 11*d* is formed between the contact part 11*e* and the second small-diameter part 11*b* and has an outer diameter larger than the outer diameter of the second small-diameter part 11*b* and smaller than the outer diameter of the contact part 11*e*.

In the coil spring of the first embodiment, to ensure the efficient compression and extension of the coil spring, there is a slight gap between the large-diameter part and the outer cylinder, and accordingly, during the compression of the coil spring, over the entire length of the large-diameter part, the large-diameter part is not maintained to be perfectly straight but is slightly bent sideways.

Meanwhile, in the coil spring of the second embodiment described above, by forming the contact part between the large-diameter parts (forming the first large-diameter part, the contact part, and the second large-diameter part in sequence), the contact part can securely maintain the center of the coil spring, and thus the length of the section of each of the large-diameter parts that bend without maintaining straight states thereof is shortened by approximately half. The length of the first large-diameter part (the second large-diameter part) according to the second embodiment decreases by approximately half compared to the length of the large-diameter part according to the first embodiment, so the degree of the bending of the large-diameter part of the second embodiment is drastically reduced. In the pogo pin according to the present disclosure, the contact part of the coil spring and the outer cylinder are compressed or in close contact with each other without a gap between the contact part and the outer cylinder, so the degree of the bending of the coil spring sideways can be significantly reduced.

Figure 6A:
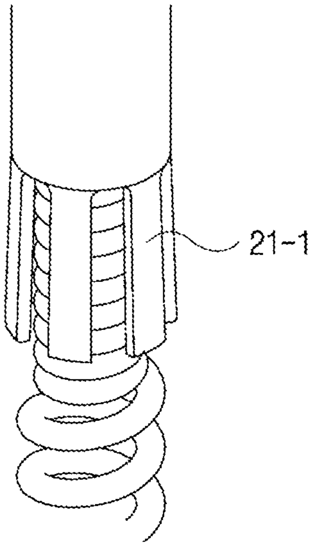
Figure 6B:
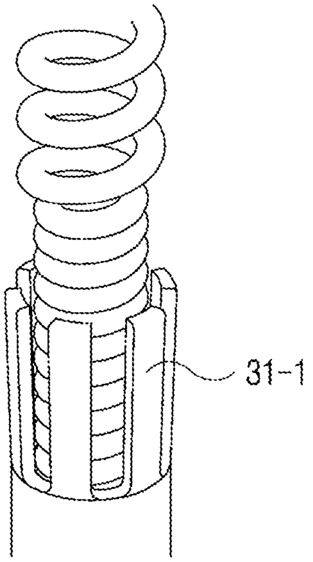
Figure 6C:
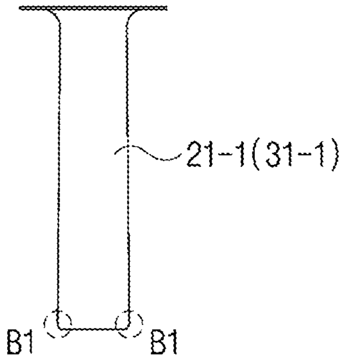
Figure 6D:
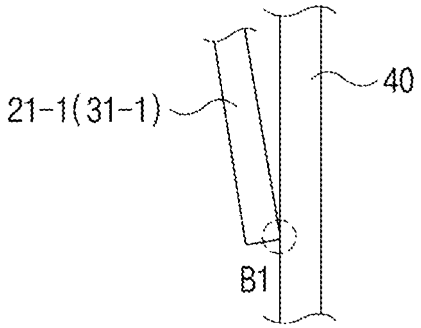
Figure 6E:
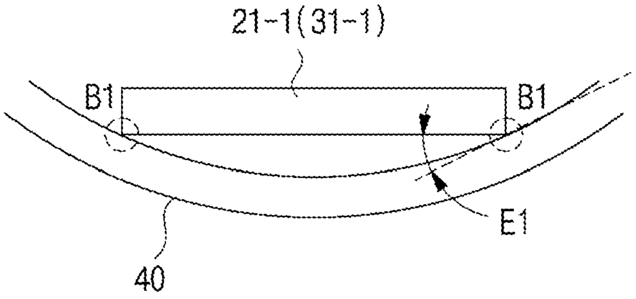

FIGS. 6A, 6B, 6C, 6D, and 6E are detailed views illustrating the brushes in the pogo pin for an ultra-high current according to the first embodiment of the present disclosure, wherein FIG. 6A illustrates the vicinity of first brushes, FIG. 6B illustrates the vicinity of second brushes, FIG. 6C is a plan view illustrating only a brush, FIG. 6D is a vertical sectional view, and FIG. 6E is a cross-sectional view.

Figure 7A:
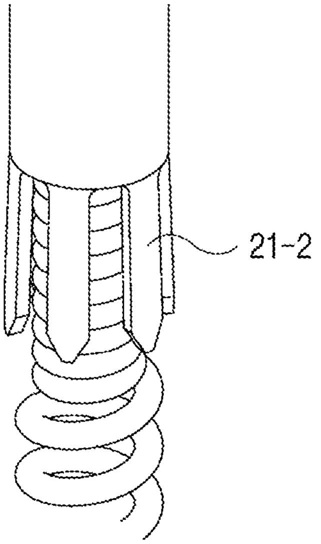
Figure 7C:
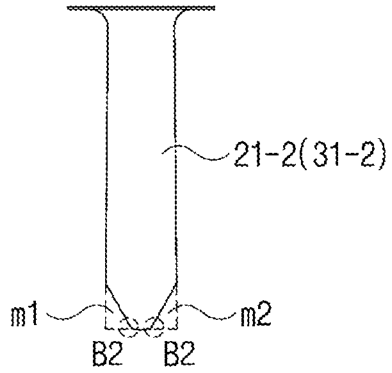
Figure 7D:
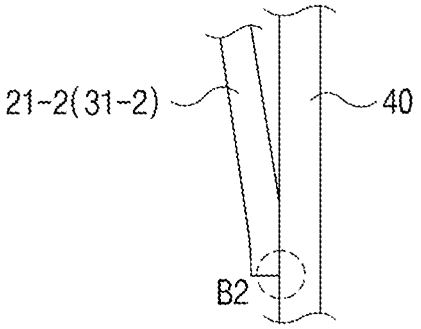
Figure 7B:
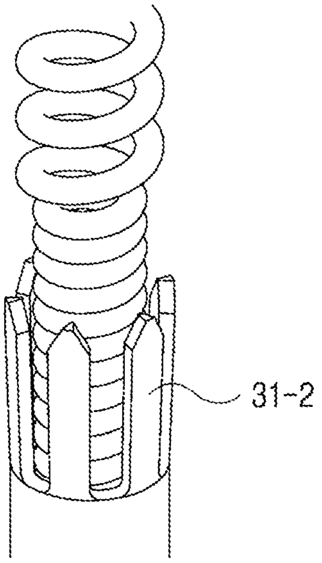
Figure 7E:
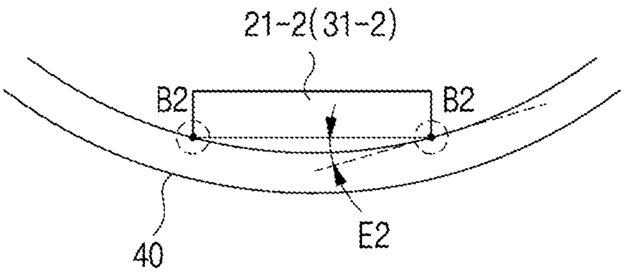

FIGS. 7A, 7B, 7C, 7D, and 7E are detailed views illustrating brushes in the pogo pin for an ultra-high current according to a third embodiment of the present disclosure, wherein FIG. 7A illustrates the vicinity of first brushes, FIG. 7B illustrates the vicinity of second brushes, FIG. 7C is a plan view illustrating only a brush, FIG. 7D is a vertical sectional view, and FIG. 7E is a cross-sectional view.

When the pogo pin for an ultra-high current according to the third embodiment of the present disclosure is compared with the pogo pin for an ultra-high current according to the first embodiment, the brushes of the first and third embodiments are different from each other. In the first embodiment of the present disclosure, the brush 21-1 or 31-1 is formed as a cantilever in which a flat metal material is approximately rectangular. The brush 21-1 or 31-1 according to the first embodiment has a rectangular shape extending after being connected to the 1-1 plunger cylindrical part (the 2-1 plunger cylindrical part).

When the brush 21-2 or 31-2 of the third embodiment of the present disclosure is compared with the brush 21-1 or 31-1 of the first embodiment, difference therebetween is that the front end of the brush 21-2 or 31-2 is chamfered. A part of the brush 21-2 or 31-2 in contact with the outer cylinder or the vicinity of the part of the brush 21-2 or 31-2 in contact with the outer cylinder is chamfered. Specifically, the front end of the brush is chamfered by removing triangular parts m1 and m2 corresponding to the vertices of an original rectangle of the front end. A plate material may be punched with a chamfered shape when punching the metal plate material for the first plunger (or the second plunger), or may be chamfered by a separate chamfering process such as cutting or grinding after the plate material is completely punched.

Due to the chamfering, the brush has a width decreasing toward the end of a front end part thereof from the front end part, and the width of the most front end is significantly reduced compared to the overall width of the brush.

In the brush 21-1 or 31-1 according to the first embodiment, a B1 part thereof is in contact with the inner surface of the outer cylinder, which is the curved surface, and in the third embodiment, a B2 part of the brush 21-2 or 31-2 is in contact with the inner surface of the outer cylinder. A distance between two B2 parts in the second embodiment is smaller than a distance between two B1 parts in the first embodiment.

An angle E2 (an angle in a cross section) between the brush and the outer cylinder in the third embodiment is smaller than an angle E1 (an angle in a cross section) between the brush and the outer cylinder in the first embodiment. In addition, the brush of the third embodiment has a width decreasing gradually in the front end part thereof, and thus may bend more easily than the brush of the first embodiment. Due to these differences, contact impedance (contact resistance) between the brush and the outer cylinder in the third embodiment is smaller than contact impedance (contact resistance) between the brush and the outer cylinder in the first embodiment.

Figure 8A:
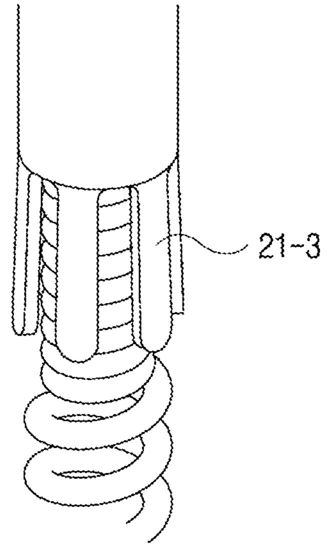
Figure 8C:
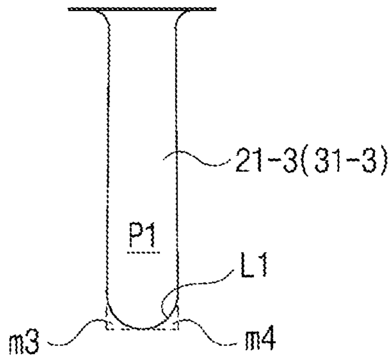
Figure 8B:
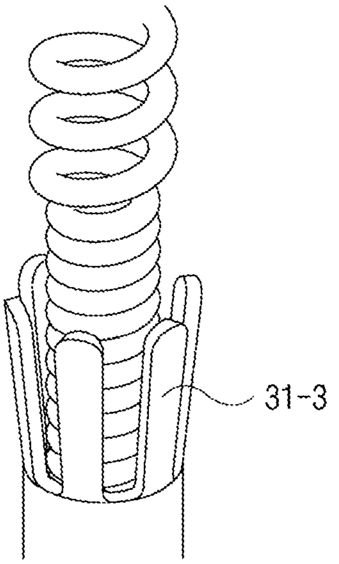
Figure 8D:
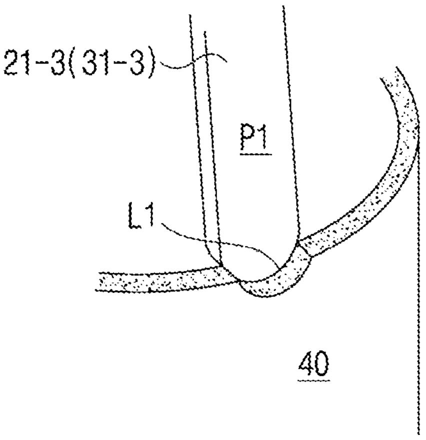

FIGS. 8A, 8B, 8C, 8D, and 8E illustrate the pogo pin for an ultra-high current according to a fourth embodiment of the present disclosure, wherein FIG. 8A illustrates the vicinity of first brushes, FIG. 8B illustrates the vicinity of second brushes, FIG. 8C is a plan view of a brush, and FIG. 8D is a cutaway cross-sectional view illustrating a portion of an outer cylinder in contact with the brush.

When the pogo pin for an ultra-high current according to the fourth embodiment of the present disclosure is compared with the pogo pin for an ultra-high current according to the first embodiment, the brushes of the first and fourth embodiments are different from each other.

A part of the brush 21-3 or 31-3 in contact with the outer cylinder 40 or the vicinity of the part of the brush in contact with the outer cylinder 40 is chamfered.

The front end part of the brush in the third embodiment is chamfered to be straight, but the front end part of the brush in the fourth embodiment is chamfered to be curved. The original rectangular parts of the front end of the brush in curved shapes are chamfered to remove the parts of m3 and m4.

A plate material may be punched with a chamfered shape when punching the metal plate material for the first plunger (or the second plunger), or may be chamfered by a separate chamfering process such as cutting or grinding after the plate material is completely punched.

The brush includes a first plane μl facing the inner surface of the outer cylinder, and a second plane parallel to the first plane and located at a side opposite to the first plane. On the end part of the brush, the outline of the first plane is a convex first curve L1 crossing the brush in a width direction thereof, and the outline of the second plane is a convex second curve crossing the brush in the width direction thereof. The first curve and the second curve may be parallel to each other. A curved surface in contact with the first curve and the second curve may be formed between the first plane and the second plane on the end part of the brush.

In the pogo pin for an ultra-high current according to the fourth embodiment, when the brush is in elastic contact (compression contact) with the inner surface of the outer cylinder, contact impedance (contact resistance) is further reduced. Since the most front end of the brush is formed in a convex curve (the first curve), the area (contact points) of contact of the brush with the outer cylinder increases, compared to when the most front end of the brush is formed in the shape of a straight line.

When the most front end is formed in the shape of a straight line, two points thereof contact with the outer cylinder as in the first embodiment and the third embodiment, but when the most front end is formed in the shape of a convexly curved line, points thereof enlarged along the line contact with the outer cylinder.

More preferably, when the brush is in elastic contact (compression contact) with the inner surface of the outer cylinder, the first curve L1 matches the inner surface of the outer cylinder (see FIG. 8D). When the brush extends and approaches the inner surface of the outer cylinder, the brush approaches the inner surface of the outer cylinder at a slight angle. The convex first curve of the brush is determined by corresponding to the curvature of the inner surface, and may be designed to have the maximum possible contact length. The first curve may be a part of an ellipse having the same length of a minor axis as an imaginary circle (a perfect circle) by the inner surface of the outer cylinder.

Figure 9A:
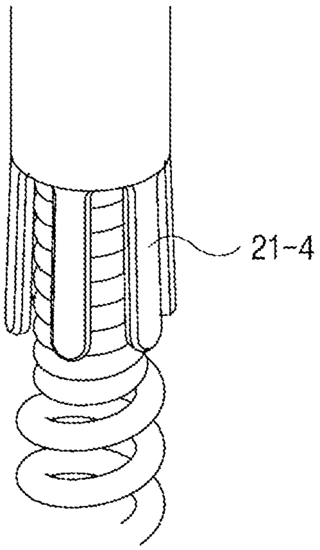
Figure 9C:
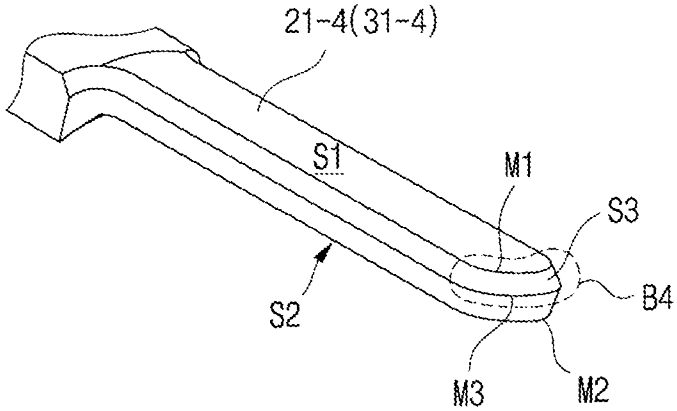
Figure 9B:
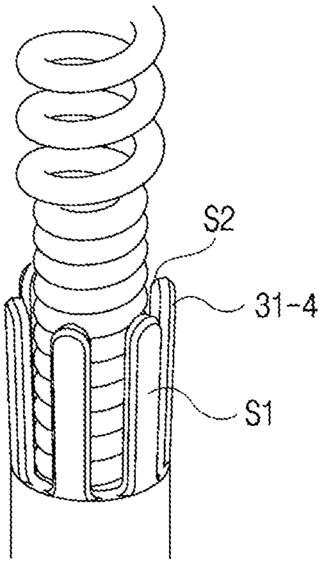
Figure 9D:
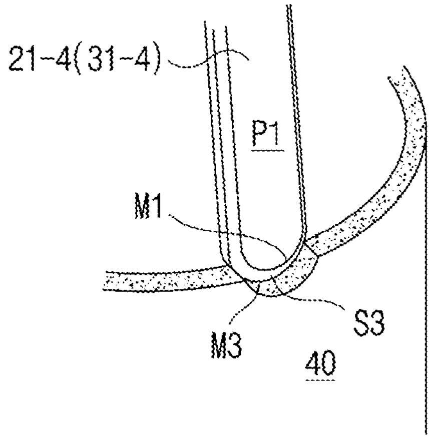

FIGS. 9Am, 9B, 9C, and 9D illustrate the pogo pin for an ultra-high current according to a fifth embodiment of the present disclosure, wherein FIG. 9A illustrates the vicinity of first brushes, FIG. 9B illustrates the vicinity of second brushes, FIG. 9C is a perspective view of a brush, and FIG. 9D is a cutaway cross-sectional view illustrating a portion of an outer cylinder in contact with the brush.

When the pogo pin for an ultra-high current according to the fifth embodiment of the present disclosure is compared with the pogo pin for an ultra-high current according to the first embodiment, the brushes of the first and fifth embodiments are different from each other.

The brush in the fifth embodiment is chamfered as a convex curve on an end part thereof as in the brush in the fourth embodiment. The outline of a first plane S1 is a convex first curve M1 crossing the brush in a width direction thereof, and the outline of a second plane S2 is a convex second curve M2 crossing the brush in the longitudinal direction thereof. A curved surface S3 in contact with the first curve is formed between the first plane and the second plane on the end part of the brush.

The curved surface S3 is formed by chamfering the brush along the first curve M1 and is formed to be oblique rather than perpendicular to the first plane and the second plane so that the area of contact of the curved surface S3 with the inner surface of the outer cylinder is increased.

A third curve M3 is a curve which is located between the first curve M1 and the second curve M2 and is formed on the side surface of the brush by chamfering an edge of the brush along the first curve M1. The curved surface S3 is formed by the first curve M1 and the third curve M3, and as a curved surface formed between the first curve M1 and the third curve M3, is formed by crossing the brush in a width direction thereof on the end part of the brush.

For example, in a method of forming the end part of the brush when punching the brush according to the second curve M2 as in the fourth embodiment, both the first plane and the second plane are first chamfered according to the second curve M2 (the curved surface formed in this case may be perpendicular to the first plane and the second plane). In addition, the first plane and the second plane are first chamfered are secondly chamfered obliquely according to the first curve M1 by grinding to form the curved surface S3.

The curved surface S3 chamfered obliquely has an effect of greatly increasing the contact area of the brush with the inner surface of the outer cylinder 40.

More preferably, the curved surface S3 may be matched with the inner surface of the outer cylinder. The entirety of the curved surface S3 may be in contact with the inner surface of the outer cylinder to make perfect surface contact therebetween. Each of the first curve M1 and the second curve M2 may be a part of an ellipse having the same length of a minor axis as an imaginary circle (a perfect circle) by the inner surface of the outer cylinder.

When the third curve M3 is brought closer to the second curve M2, the area of the curved surface S3 will increase.

FIGS. 10A, 10B, and 10C illustrate the pogo pin for an ultra-high current according to a sixth embodiment of the present disclosure, wherein FIG. 10A is a partial perspective view of the outer cylinder, FIG. 10B is a side view of the second plunger, and FIG. 10C is a partial sectional view illustrating the outer cylinder and the second plunger combined with each other.

The pogo pin for an ultra-high current according to the sixth embodiment of the present disclosure is characteristically different in the outer cylinder compared to the pogo pin for an ultra-high current according to the first embodiment. In the pogo pin for an ultra-high current according to the first embodiment of the present disclosure, the annular groove 44 prevents the removal of the second plunger 30 after the assembly. Looking at the process of the assembly in detail, the first plunger 20, the coil spring 10, and the second plunger 30 are inserted into the outer cylinder 40 in a state in which the outer cylinder 40 formed up to the groove 44 is turned upside down, and as described above, the lower end of the 2-1 plunger cylindrical part is held inside the groove 44 so that the removal of the second plunger 30 is prevented. However, forming the annular groove 44 recessed inward on the outer cylinder 40 is a very demanding process.

The pogo pin for an ultra-high current according to the sixth embodiment of the present disclosure is intended to realize a structure for preventing the plunger from leaving after the assembly without forming the groove 44 and to be more easily manufactured.

An outer cylinder 50 includes a first cylindrical part (not shown) and a second cylindrical part 52, wherein the outer diameter of the second cylindrical part 52 is larger than the outer diameter of the first cylindrical part.

The outer cylinder 50 (more specifically, the second cylindrical part 52) has a U-shaped or inverted U-shaped window 52*b* and a holding piece 52*a* formed by punching the window. For convenience of description, the outer cylinder 50 is referred to as having "a U shape", but the range of "the U shape" includes a shape with angled corners as shown. The holding piece 52*a* extends in the longitudinal direction of the second plunger, and a free end of the holding piece is directed toward the center portion of the outer cylinder, and a part B5 (a side opposite to the free end) connected to the holding piece is manufactured to be slightly bent so that the free end of the holding piece is slightly recessed to the inside of the outer cylinder.

After the outer cylinder and the second plunger are assembled with each other, the lower end of the 2-1 plunger cylindrical part (a step between the 2-1 plunger cylindrical part and the 2-2 plunger cylindrical part) is held on the holding piece 52*a* (the free end of the holding piece) to be prevented from being removed.

Looking at the assembly process in detail, the first plunger 20, the coil spring 10, and the second plunger 30 are sequentially inserted into the outer cylinder 50 in a state in which the outer cylinder 40 formed up to the holding piece is turned upside down. Particularly, when the second plunger 30 is inserted into the outer cylinder, the brush and the 2-1 plunger cylindrical part moves on the holding piece while pushing the free end of the holding piece 52*a* outward.

In the case of the first embodiment, due to the groove 44, when the brush and the 2-1 plunger cylindrical part move on the groove 44, the brush and the 2-1 plunger cylindrical part are required to move on the groove 44 while pushing the outer cylinder outward. However, in the pogo pin for an ultra-high current of the sixth embodiment, the brush and the 2-1 plunger cylindrical part move only the free end of the holding piece, but are not required to push the outer cylinder outward.

According to the pogo pin for an ultra-high current of the sixth embodiment, the groove is not required to be formed, and instead of the groove, the holding piece, which can be formed more easily, is formed, thereby making a manufacturing process easier and increasing yield.

FIG. 11 is a sectional view illustrating the pogo pin for an ultra-high current and a socket body according to a seventh embodiment of the present disclosure.

Multiple pogo pins for an ultra-high current are arranged to be spaced apart from each other one-dimensionally or two-dimensionally in the socket body 60, and each of the pogo pins is placed in a standing state in a through hole formed in the socket body 60.

The first plunger 20 includes the 1-2 plunger cylindrical part 23 connected to the first probe part 24 for contact with the outside and extending in a cylindrical shape, and the outer cylinder 40 includes the first outer cylindrical part 41 guiding the 1-2 plunger cylindrical part 23 and having a cylindrical shape, wherein the first outer cylindrical part 41 is formed to extend from the inside of the socket body 60 to the surface of the socket body 60.

Conventionally, the first outer cylindrical part 41 is formed from the inside of the socket body 60 only to the middle thereof without reaching the surface of the socket body 60.

In contrast, in the seventh embodiment of the present disclosure, the outer cylinder is formed up to the surface of the socket body, and due to this structure, the guide function of the outer cylinder for the first plunger (the 1-2 plunger cylindrical part) is more stable, and when the first probe part operates in a vertical direction, the horizontal shaking of the first probe part is minimized. In addition, there is allowance between the outer cylinder in the through hole formed in the socket body and the inner surface of the socket body, and jamming between the first plunger (the 1-2 plunger cylindrical part) and the outer cylinder (the first outer cylindrical part) is reduced.

What is claimed is:

1. A pogo pin for an ultra-high current, the pogo pin comprising:

a first plunger;

a coil spring configured to elastically support the first plunger; and an outer cylinder allowing the coil spring to be mounted therein and configured to guide sliding of the first plunger, wherein a plurality of brushes is provided on one end of the first plunger such that the plurality of brushes is capable of sliding while elastically contacting an inner surface of the outer cylinder, wherein a part of each of the brushes in contact with the outer cylinder or a vicinity of each brush in contact with the outer cylinder is chamfered, wherein each brush comprises a first plane facing the inner surface of the outer cylinder and a second plane parallel to the first plane and located at a side opposite to the first plane, wherein an outline of the first plane on an end part of each brush is a convex first curve crossing a width direction of each brush, and an outline of the second plane on the end part of the brush is a convex second curve crossing the width direction of each brush, wherein a curved surface (S3) in contact with the first curve is formed between the first plane and the second plane on the end part of each brush, wherein the curved surface (S3) is formed to be oblique rather than perpendicular to the first plane and the second plane so that an area of contact of the curved surface (S3) with the outer cylinder is increased, wherein the first plunger made of a flat metal material forms a hollow cylindrical body.

2. The pogo pin of claim 1, wherein the curved surface (S3) is formed by chamfering the end part of each brush along the first curve or the second curve.

3. The pogo pin of claim 1, wherein the first plunger comprises a 1-2 plunger cylindrical part (23) connected to a first probe part (24) for contact with the outside and extending in a cylindrical shape, and the outer cylinder comprises a first outer cylindrical part (41) guiding the 1-2 plunger cylindrical part (23) and having a cylindrical shape, wherein the first outer cylindrical part (41) is formed to extend from an inside of a socket body (60) to a surface of the socket body.

* * * * *